(12) United States Patent
Bonner et al.

(10) Patent No.: US 6,662,752 B1
(45) Date of Patent: Dec. 16, 2003

(54) SMALL ANIMAL SHELTER (75) Inventors: Mark Bonner, Frenchtown, NJ (US); R. Alan Bonner, Frenchtown, NJ (US)

(73) Assignee: Holton Industries t/a Bio-Serv, Frenchtown, NJ (US)

( * ) Notice: Subject to any disclaimer, the term of this patent is extended or adjusted under 35 U.S.C. 154(b) by 0 days.

(21) Appl. No.: 10/259,692

(22) Filed: Sep. 30, 2002

(51) Int. Cl.⁷ .................................................. A01K 1/03
(52) U.S. Cl. ........................ 119/482; 119/702; 119/704
(58) Field of Search ................................. 119/482, 484, 119/428, 496, 701, 702, 703, 704

(56) References Cited

U.S. PATENT DOCUMENTS

| | | | | |
|---|---|---|---|---|
| 511,272 A | * | 12/1893 | Hughes | 119/452 |
| 2,002,259 A | * | 5/1935 | Cole | 119/482 |
| 2,902,976 A | * | 9/1959 | Wilson | 119/756 |
| 3,994,262 A | * | 11/1976 | Suchowski et al. | 119/700 |
| 4,334,501 A | * | 6/1982 | McDaniel et al. | 119/482 |
| 5,551,371 A | * | 9/1996 | Markey et al. | 119/499 |
| 5,577,464 A | * | 11/1996 | Wellington et al. | 119/475 |
| 5,649,503 A | * | 7/1997 | Woolfolk | 119/700 |
| 5,713,302 A | * | 2/1998 | Walter | 119/165 |
| 5,964,190 A | * | 10/1999 | Willinger et al. | 119/500 |

OTHER PUBLICATIONS

Photo from Habitrail catalogue on the Internet. Habitrail Spin–around.

* cited by examiner

Primary Examiner—Yvonne Abbott (57) ABSTRACT

The present invention relates to an animal shelter comprising an enclosure having at least one opening for ingress and egress of an animal, and means for attaching an exercise disk to the shelter.

4 Claims, 7 Drawing Sheets

SMALL ANIMAL SHELTER

FIELD OF THE INVENTION

This invention relates to an improved small animal shelter. The improved shelter has means for attaching useful devices to it for the benefit of the animals. The useful devices include feeding tubes, feeding cups, water bottles, activity equipment such as exercise wheels and Jungle Jim apparatus, challenging entertainment devices such as toys, chew items and reward treats, and the like.

BACKGROUND OF THE INVENTION

Many people maintain small animals as pets or for scientific purposes. There are many commercially available homes for small animal pets. The homes are typically an aquarium style, and are made of glass or a transparent thermoplastic material, such as acrylic or polycarbonate.

An animal shelter is a smaller structure within the home, approximately 2 to 15 times the size of the animal, and serves as a nesting or hiding place for the animal. As used herein, an animal shelter is a structure that is smaller than an animal home and is typically placed within the animal home to provide comfort and a feeling of safety to the animal. These shelters are an ideal environment for hiding, sleeping, breeding and a place to raise their young. Animal care takers such as scientists, technicians, children, and parents observe these animals at various times, such as while the animals are interacting, sleeping, breeding, or caring for their young.

Small animals benefit from the presence of devices, which help promote good animal maintenance and health. Such devices typically include feeding tubes, feeding cups, water bottles, activity equipment such as exercise wheels and Jungle Jim apparatuses, entertainment devices such as toys, chew items and reward treats. Currently the devices are separate, freestanding, and take up significant space in the animal home. There is therefore, a need for an animal shelter that would allow other devices to be incorporated onto the shelter thus providing the animal with a number of items it needs while maintaining the free space within the cage.

The Mouse Igloo™ is an animal shelter that is commercially available from Bio-Serv Incorporated, Frenchtown, N.J. The shelter has several openings for animals to enter and exit the shelter. The shelter is made of polycarbonate and has a colorant that reduces light penetration or eliminates it completely. Exercise wheels are commercially available and are typically free standing such as the Habitrail Spin-Around or attached to the wall such as the Leo Braun Wheel. These wheels reduce the free floor space in the home.

In view of the disclosed prior art, there is a continuing need for an animal shelter that incorporates other devices onto its structure, thereby decreasing the number of items that are on the floor which reduce the free floor space of the home. This is an important feature as the required floor space area is mandated in the Animal Welfare Act regulations and in The National Research Council's "Guide for the Care Use of Laboratory Animals."

SUMMARY OF THE INVENTION

The present invention provides an animal shelter having means for attaching a device to the shelter. In a preferred embodiment, the present invention provides an animal shelter, that serves as a hub, having means for attaching a device or means for attaching several devices to the shelter; and a device having means for attaching said device to said shelter; wherein said device is attached to said shelter by said means for attaching. In another embodiment, the present invention provides an exercise disc that has means for attachment to a hub.

DETAILED DESCRIPTION OF THE INVENTION

Animal shelters are described in co-pending U.S. patent application Ser. Nos. 09/873,992 and 10/005,502. Both references are hereby incorporated by reference in their entirety.

The shape of the shelter is not critical. Suitable shapes include squares, rectangles, triangles, pyramids, cones, half-spheres, half-hexagons, tepees, half-diamonds, and other shapes taught in the above-mentioned co-pending Patent Applications. Half-spheres are preferred. The size of the shelter is sufficient to house at least one small animal, preferably multiple small animals.

The shelter contains at least one opening for ingress and egress of animals. Multiple openings may be useful, for example 2, 3, 4, 5, or 6 openings may be utilized. The shelter preferably contains 3 openings. The shape of the openings is not critical. Suitable shapes include, but are not limited to, circles, ellipses, squares, rectangles, triangles, and stars. The size of the openings is sufficient to enable the ingress and egress of the small animals. Generally, the height of the opening may range from about 1.25 cm to about 6.25 cm, preferably from about 2.5 cm to about 5 cm. The width of the openings generally ranges from about 1.25 cm to about 6.25 cm, preferably from about 2.5 cm to about 5 cm.

The shelters may be made by processes known in the art. One suitable process is injection molding, where plastic material is melted and injected into a mold in the shape of the shelter, then cooled. Another suitable process is thermo-forming plastic sheet, where a plastic sheet is melted and molded into the suitable shape, then the openings are cut or stamped. Vacuum forming is another useful process where plastic sheet is heated and drawn by vacuum into the suitable shape, then cooled. The openings are then cut or stamped into the shelter.

The animal shelter may be made of a polymeric material that is transparent and can be autoclaved. Suitable polymeric materials include polyolefins, such as, but not limited to, high molecular weight polyethylene, ultra high molecular weight polyethylene, and polypropylene; polyphenylsulphone; styrene; acrylates and methacrylates, such as, but not limited to, methyl acrylate, methyl methacrylate, ethyl acrylate, ethyl methacrylate, butyl acrylate, butyl methacrylate, and the like; polyamides, such as, but not limited to, nylon 6, nylon 6,6, nylon 12, nylon 101, and the like; polycarbonate; combinations thereof; and copolymers thereof. Polycarbonate is preferred. The polymeric material may be provided in solid form, such as a sheet or a powder, or in liquid form, depending on the desired process for manufacturing the shelter.

A colorant may be added to the polymeric material, or coated onto the polymeric material the shelter is made from in order to inhibit specific wave lengths of light from getting into the shelter. Suitable colorants do not change the transparency of the polymeric material when combined with the polymeric material. Such colorants include, but are not limited to, red, burgundy, pink, orange, yellow, amber, green, blue, turquoise, violet, and purple. Red and amber are preferred. The colorants are commercially available as, for example, FD & C Red and the like.

When the colorants are to be combined with the polymeric materials, the colorants should be soluble in the polymeric materials. The amount of colorant utilized will vary, but is sufficient to inhibit light penetration into the shelter, yet provide a transparent shelter. Generally, the amount of colorant ranges from about 0.001 percent by weight to about 10 percent by weight, based on the total weight of the material making up the shelter.

When the colorant is placed onto the shelter, the colorant generally is contained in a plastic film or is in liquid form. The amount of colorant utilized in the plastic film or liquid will vary, but is sufficient to inhibit light penetration into the shelter, yet provide a transparent shelter. Plastic films containing colorants may be placed onto the shelter by methods known in the art, such as the use of an adhesive to adhere the plastic film to the shelter, shrink wrapping the plastic film onto the shelter, or using heat to fuse the plastic film with the shelter. Liquid colorants may be applied by methods known in the art, such as spray coating, dip coating, and brush coating.

The shelter of this invention has means for attachment that would allow a device or devices to be connected to the shelter. The shelter and the device have attachment means that are complimentary, which enables attaching the device and the shelter together. The complimentary means for attachment typically are a hole in the shelter and a protrusion or a shaft in the device. Alternatively, both the shelter and the device may have similar attachment means, such as a hole, and the connecting means may be an insert, such as a pin or a shaft.

For the shelter, suitable means for attachment include, but are not limited to, a hole, a protrusion such as an appendage, a pin, a shaft, a tongue, or a ridge; and an indentation such as a cup a groove, a slot, or a notch. It is envisioned that the shelter may have more than one means for attachment to accommodate attaching multiple devices. The attachment means may be made of the same material as the shelter. Alternatively, the attachment means may be made of other materials, such as, but not limited to plastic, metal, wood or rubber.

The hole, protrusion or indentation can be perpendicular, or at a different angle to the surface of the shelter. The hole, protrusion or indentation can be tangent and perpendicular, or at different angles than perpendicular and tangent to the surface of the shelter.

The attachment means may be formed into the shelter during the process of making the shelter, such as in the mold utilized for injection molding. Alternatively, the attachment means may be attached to the shelter through the use of an adhesive, ultrasonic welding, fasteners, clips and the like. In the case of a hole, it may also be drilled out after forming the shelter. The hole may be lined with a material, such as a metal or a plastic insert or a clip, a bushing, a rubber or elastomeric ring, and the like.

The device to be attached to the shelter may be any useful device for animals, including, but not limited to, feeding tubes, feeding cups, liquid reservoirs, activity equipment such as an exercise wheel or a Jungle Jim apparatus, challenging entertainment devices such as toys, NYLABONE™ chew items, marbles, balls and reward treats. When the shelter utilizes a hole for the attachment means, the device may contain an insert that attaches to the hole, thereby attaching the device to the shelter. The insert may be smooth or threaded. The insert may be a pin, a stud, a stainless steel shaft, a screw, a bushing, a protrusion or the like. The insert could be sized appropriately to fit tightly in the hole of the shelter.

The insert may be molded integrally with the shelter or device. Alternatively, the attachment means may be attached to the shelter or device through the use of an adhesive, ultrasonic welding, fasteners, clips and the like.

In use, the insert of the device is placed into the hole of the shelter. The insert may be press fit into the hole of the shelter or screwed into the hole of the shelter. The attachment means may be snap-fit as is known in the art. If desired, an adhesive or ultrasonic welding may be utilized to permanently attach the insert to the hole or surface.

When the shelter means for attachment is a protrusion such as pin, shaft, ridge, or tongue, the device means for attachment may be a hole or indentation. Suitable holes or indentations include, but are not limited to, a cup, a groove, a slot, and a notch that the protrusion of the shelter fits into.

Where the shelter means for attachment is a hole or an indentation such as a cup, a groove, a slot or notch, the device means for attachment may be a protrusion such as an appendage, pin, shaft, tongue or ridge, that fits into the shelter means for attachment. In use, one end of the attachment means is to be secured and the other end is a slip fit although both ends could be a slip fit and both ends could be secured. The secured end of the attachment means may be snap-fit as is known in the art. If desired, an adhesive or ultrasonic welding may be utilized to permanently attach the secured end of the attachment means to either the device or the shelter.

The device to be attached to the shelter may be a liquid reservoir or food cup as is known in the art. Where the device is a water bottle or food cup, the placement for the attachment means on the shelter is not critical. The device should attach to the shelter in a position that the animal can reach the food or water and the entrances or exits to the shelter are not blocked.

Where the device is a feeding tube or a liquid reservoir, the delivery of the food or water is desired inside the shelter. In this embodiment, the placement for the attachment means may be above the entrance to the shelter, so that the dispenser is within the opening to the shelter.

Preferably, the device is an exercise wheel. The exercise wheel may be a flat circular disk or an ergonomically contoured disk. The disk is designed to accommodate at least one small animal, such as a mouse.

Exercise wheels or disks, such as the Habitrail Spin-Around running wheel, are a familiar piece of exercise equipment in a mouse home. The exercise disk of this invention is in the form of a contoured disk and is unconventional in that it is supported by a shelter, which serves as a hub. Suitable hubs include, but are not limited to, an animal shelter, feeding apparatus, liquid reservoirs, activity equipment, and challenging entertainment apparatus. The shelter or other devices serve as a hub for the disk to spin on.

The Exercise disk of this invention is contoured to accommodate both the animal and the hub, providing a contoured surface on its outside edge, which is convenient for the animal to run on and a contoured area within the center of the disk, which allows this disk to nest down around the device being used as its hub.

These combined contours within the disk provide for a more compact assembly of this disk with other home devices. These combined contours provide for a lower profile of the assembly (hub and disk) than would otherwise be possible and is ideal for laboratory homes which have low ceilings (cage tops) or limited vertical height. In the case where the hub is a half spherical animal shelter or cylindrical tunnel, the center of the disk could also be spherical, allowing the disk to nest closely down around the shelter or about one end of a tunnel. In the case where the hub is a square shelter or feeding tray, the center of the disk could be conical.

This center contour allows for a very close nesting of the disk with the hub. This quality (the center contour) lowers the profile of the over all assembly which additionally lowers the running surface, making it more accessible to the animal.

These contours or characteristics of the disk are similar to the characteristics of a hat. Where the rim of the hat is the running surface and the head, which the hat is on, represents the hub. The center of the hat is contoured to conform to the head, which allows the hat to nest down around the head, permitting the rim of the hat to sit down appropriately around and about the forehead. Similarly the center of the disk is appropriately contoured to fit down around the hub. The center contour allows the running surface, (rim of the hat) to be lower or closer to the floor of the cage than it could be with out this center contour and again provides for a lower overall profile of the combined disk and hub.

The present invention describes an attachment means, attachment location and exercise disk contours for the combination of an animal shelter with this new Exercise disk.

A conventional running wheel relies on gravity or the weight of the mouse to spin the wheel. As the mouse climbs the side of the wheel the weight of the mouse causes the wheel to spin. The mouse stays in relatively one place, which is at the bottom or the lowest point on the wheel.

The exercise wheel design of the present invention is based on a flat disk set on a shaft at its center. If this disk is put to 90° (vertical) there is no surface for the animal to climb on. At the other extreme, if the disk is set to 0° (horizontal) there is ample surface area but the disk does not have the tendency to spin.

When the disk of the present invention is set to an angle in between these two extremes, the disk will then have a high side and a low side and if a weight, such as a mouse, was to be placed on the disk, this weight would cause the disk to spin until the weight ended up at the lowest point on the disk. The angle of the disk determines the likelihood that the disk will spin and how fast. If the disk is set at a very small angle such as 1°, the disk would be less likely to respond by spinning when a weight is placed on it. On the other hand if the disk is placed at an angle of 45°, the disk would readily spin at the addition of the weight. The angle of the surface also determines the ease with which the weight/mouse can stay on its surface. At 1°, the mouse would stay on very easily but at 45°, there could be some difficulty and effort. Non-slip texturing and ergonomic contours in the disk surface can help to keep the mouse from sliding off the disk at the higher angles.

The angle of the attachment means for the exercise disk, used in the present invention is preferably set to 26°. The axis of the running disk is perpendicular to the shelter and 26° off the vertical providing a spinning plane, for the exercise disk that is 26° off the horizontal plane.

The disk may be made of any suitable material, such as, but not limited to, wood, plastics, or metals. Plastic materials are preferred. Suitable plastics include, but are not limited to, polyolefins, such as, but not limited to, high molecular weight polyethylene, ultra high molecular weight polyethylene, and polypropylene; polyphenylsulphone; styrene; acrylates and methacrylates, such as, but not limited to, methyl acrylate, methyl methacrylate, ethyl acrylate, ethyl methacrylate, butyl acrylate, butyl methacrylate, and the like; polyamides, such as, but not limited to, nylon 6, nylon 6,6, nylon 12, nylon 101, and the like; polycarbonate; combinations thereof; and copolymers thereof. The plastic material may be provided in solid form, such as a sheet or a powder, or in liquid form, depending on the desired process for manufacturing the disk.

The exercise disk may be made by methods known in the art such as, but not limited to, machine cutting, vacuum forming, blow molding and injection molding. The disk has an upper surface and a lower surface. The device attachment means are located on the lower surface of the disk. The animal exercises on the upper surface of the exercise disk. The upper surface of the exercise disk may be treated to provide better traction for the animal. Suitable treatments include, but are not limited to, texturing the surface in the molding process, such as forming ribs or embossments or by abrading the material and or coating the surface with an elastomeric material such as rubber.

The preferred configuration of the disk is contoured. The center of the disk is contoured to conform and fit closely to the shelter of this invention and the outside edge of the disk or running surface is ergonomically contoured for the comfort and convenience of a mouse, providing a level surface for the animal to run on.

In the preferred embodiment, the exercise disk is ergonomically contoured, has an outside dimension of 6 inch diameter, is 1/8 inch thick, is made of tinted polycarbonate, has a space between the disk and the shelter of 1/16 inch, and it's axis is 26 degrees off the vertical and perpendicular to the shelter. The attachment means is a stainless steel shaft which is press fit into the shelter and slip fit into the disk. The contour of the center of the disk, from 0 to 3.5 inches of its 6 inch overall diameter, is spherical having a 4.75 inch diameter on the lower surface of the disk and a 5 inch diameter on the upper surface of the disk. The contour of the outside edge of the disk, from 3.5 inches to 6 inches of its diameter is also spherical, curving in the opposite direction to the center and having a 20 inch diameter on the upper surface and a 20.25 inch diameter on the lower surface.

The preferred exercise disk of this invention is 6 inches in diameter. The size of the disk can vary from 4 to 12 inches. The smaller disks serve to accommodate restricted spaces and the larger disks serve to accommodate bigger animals such as rats or guinea pigs. The thickness of the disk may range from 1/32 inch to 1/4 inch. The preferred material for the disk is polycarbonate plastic.

The exercise disk should be attached to the outer surface of the shelter, operate without blocking the entrances or exits to the shelter, not interfere with the shelter, and be mounted in a manner that the animal can climb onto the upper surface of the disk. In order for the disk to spin freely, there must be a gap between the shelter and the disk. The gap between the shelter and the disk may vary between 1/32 inch and 1 inch.

The attachment means for the disk must provide an axis that the disk will spin on. It is preferred, for this type of disk design, that the axis be perpendicular to the surface of the shelter, but the axis could be set at an appropriate angle which would not allow the disk to interfere with the shelter. The preferred axis for the disk is 26° from the vertical, which provides a spinning plane of 26° off the horizontal. Alternatively, the axis could be from about 1° to about 45°, preferably from about 10° to about 35°, and more preferably from about 20° to about 30° the preferred attachment means is a stainless steel shaft.

Figure 1:
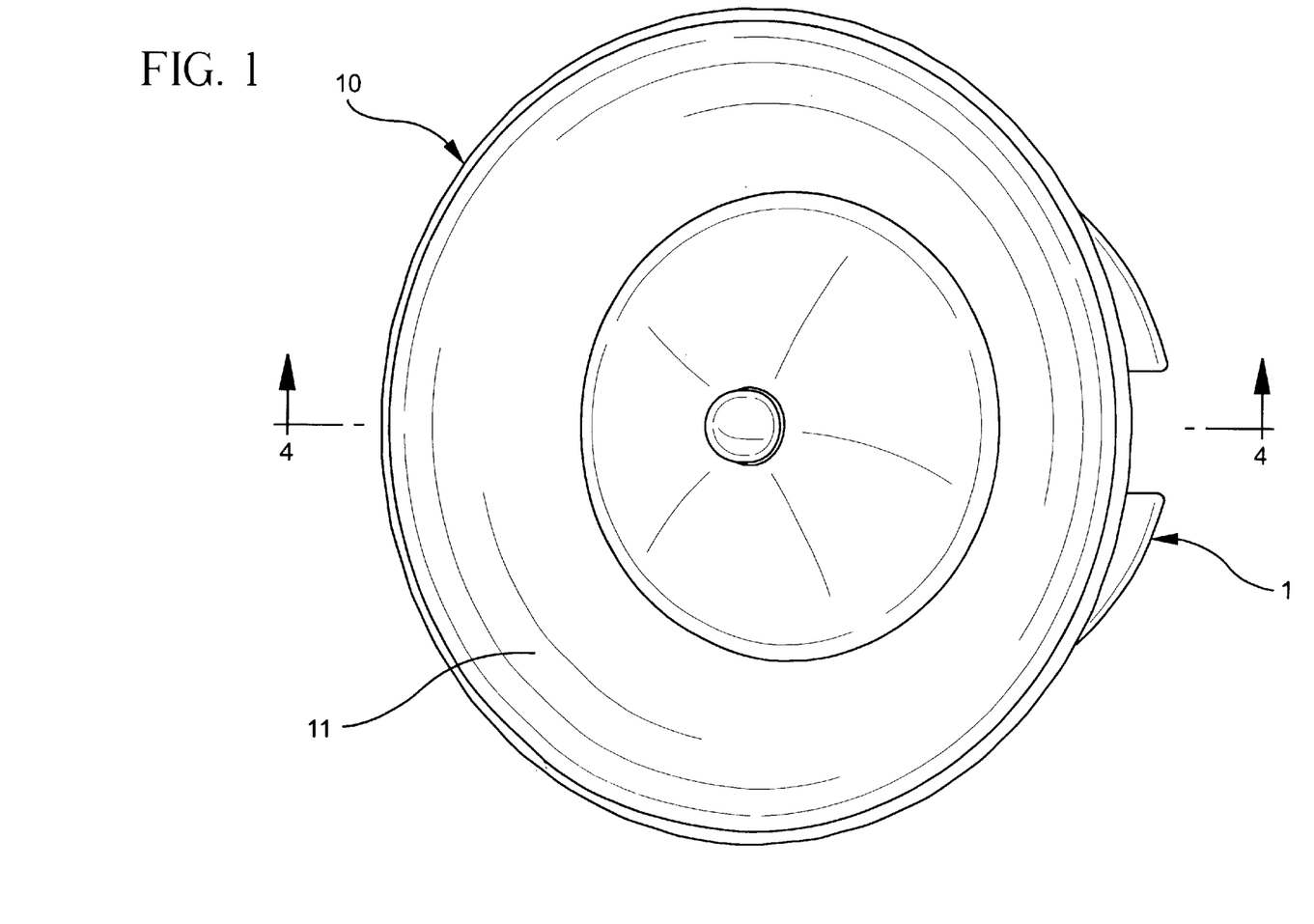
FIG. 1 is a animal shelter and means for attaching a device according to the invention.
Figure 1A:
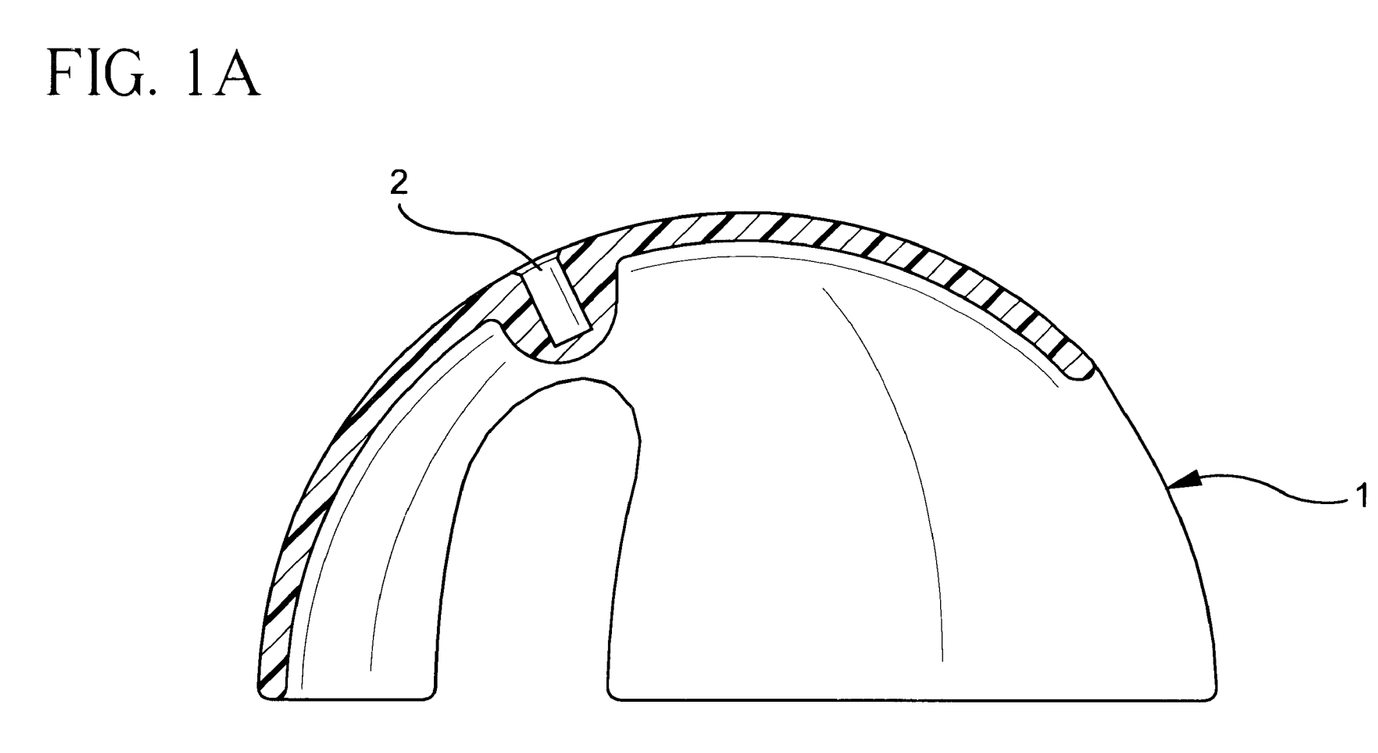
FIG. 1A is a cross-sectional view of the shelter taken along line 4—4. Shelter 1 is a half sphere having 3 openings for ingress and egress of an animal. The shelter is made from polycarbonate. Means for attaching 2 a device is a cup that is formed during the process for manufacturing the shelter.
Figure 2:
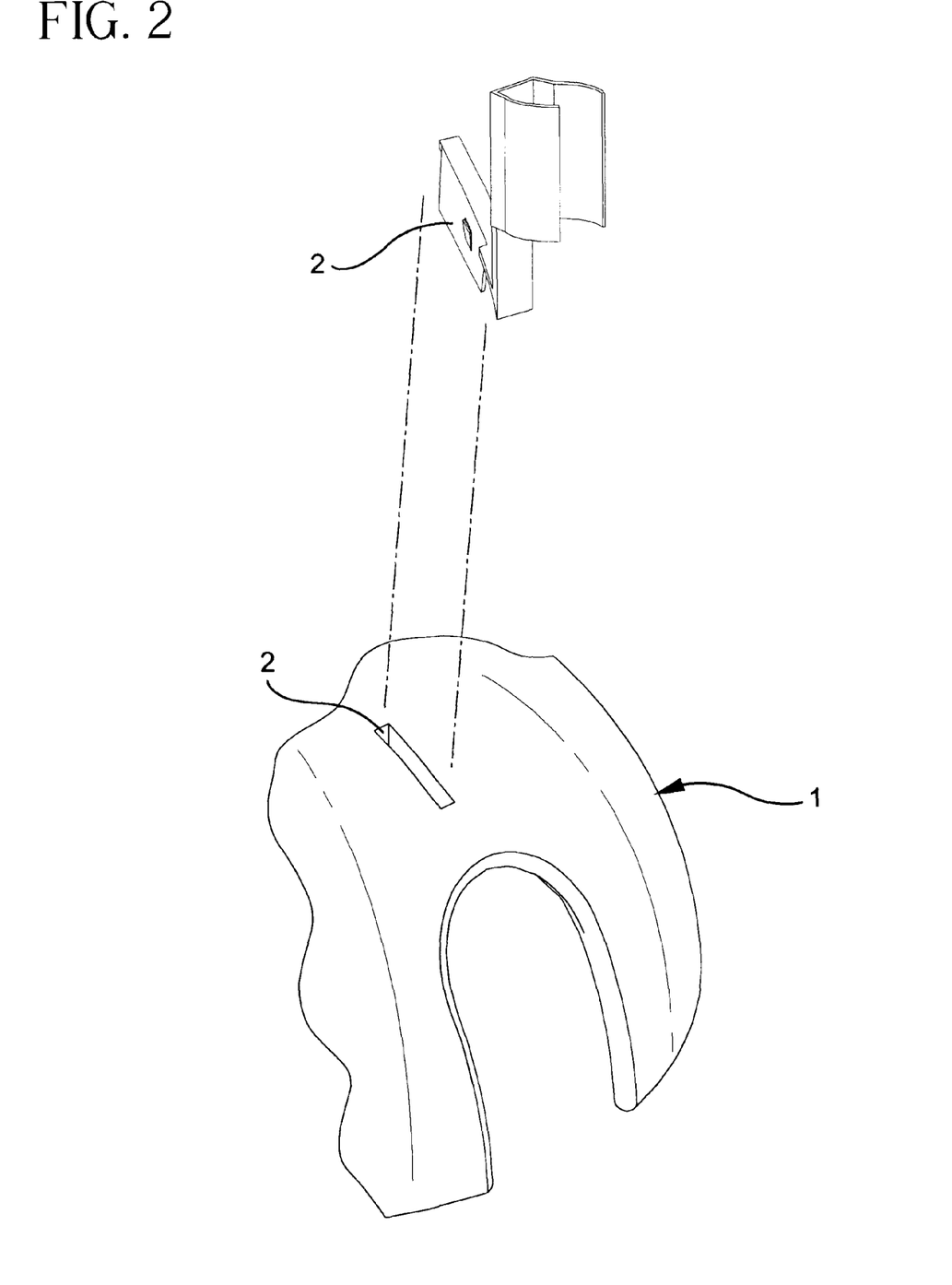
FIG. 2 is an exploded view of means for attachment where the means for attaching 2 a device on the shelter is a groove and the means for attaching 2 a device on the device is a tongue.
Figure 3:
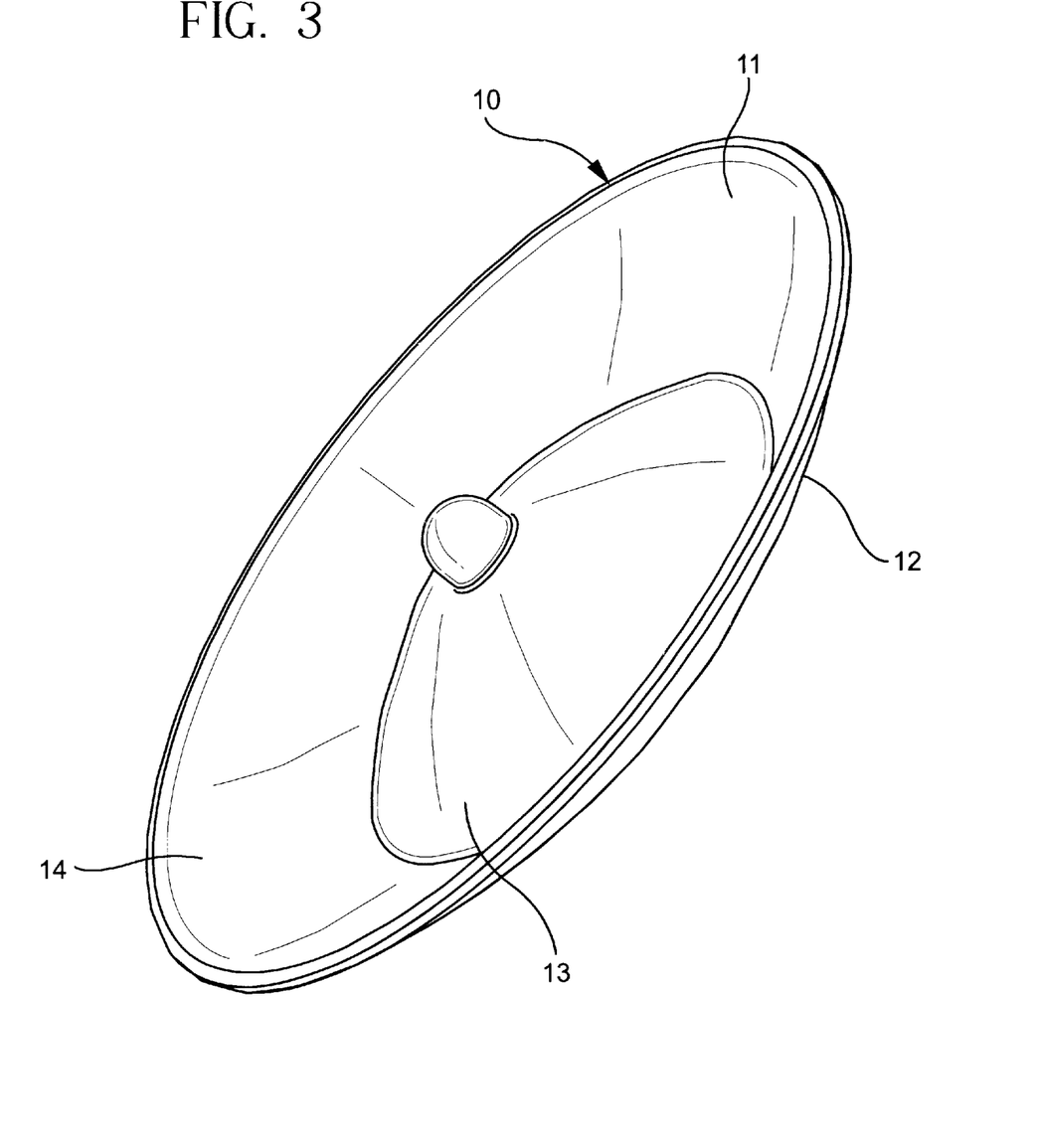
FIG. 3 is a side view of an exercise disk according to the invention. Exercise disk 10 has an upper surface 11, a lower surface 12, a contour 13 that is complimentary to the hub, and a contour 14 to help the animal remain on the disk 10.
Figure 4:
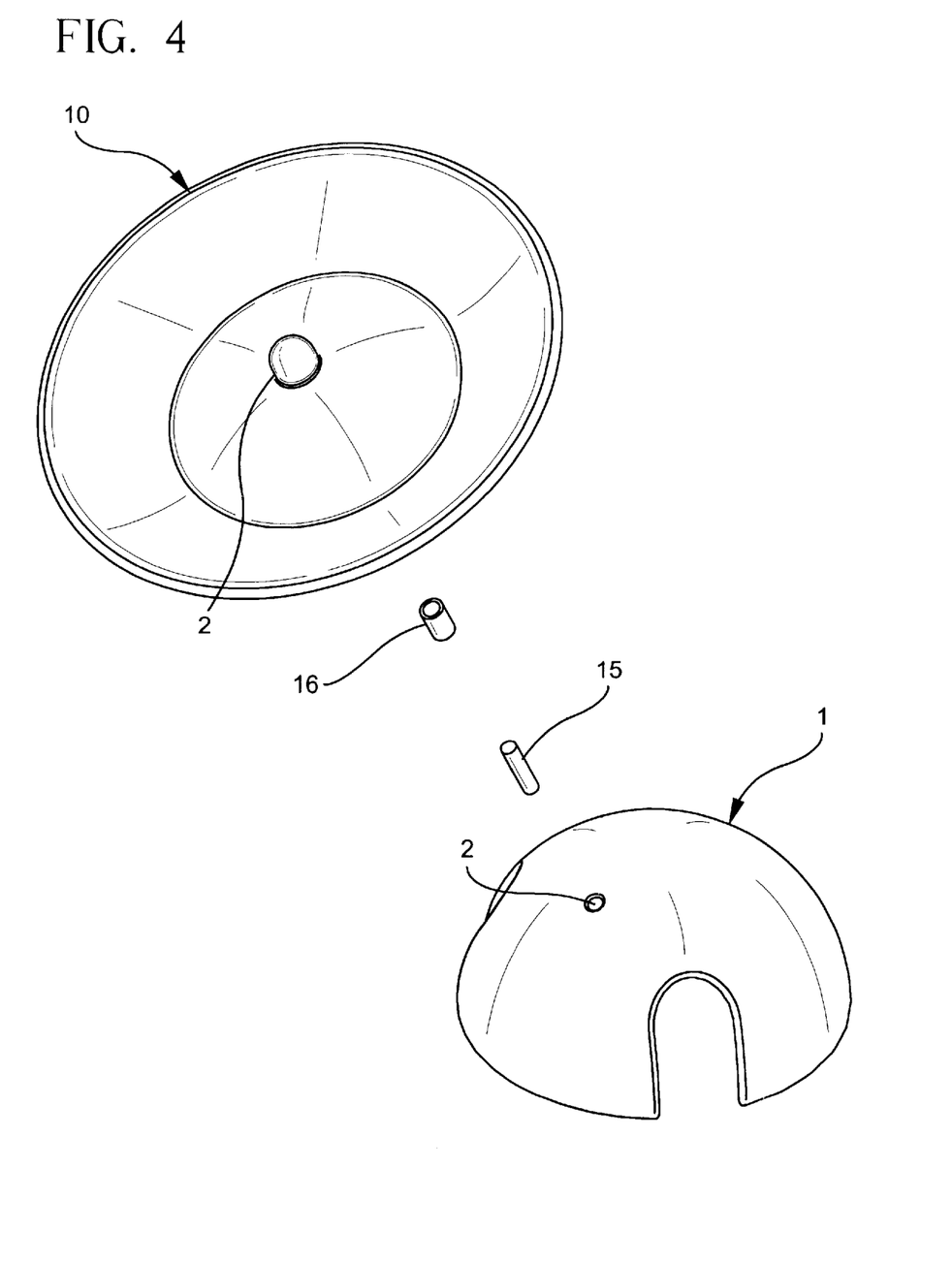
FIG. 4 is a side view to illustrate a means for attaching the exercise disk of the invention to the hub. Shelter 1 has a hole as a means for attaching 2 a device. Pin 15 is inserted at one end into the shelter means for attachment 2. A bushing 16 is placed on the other end of the pin 15. Exercise disk 10 has a cup as a means for attachment 2. The end of the pin with the bushing on it is inserted into the cup in the exercise disk to attach the disk to the shelter.
Figure 5:
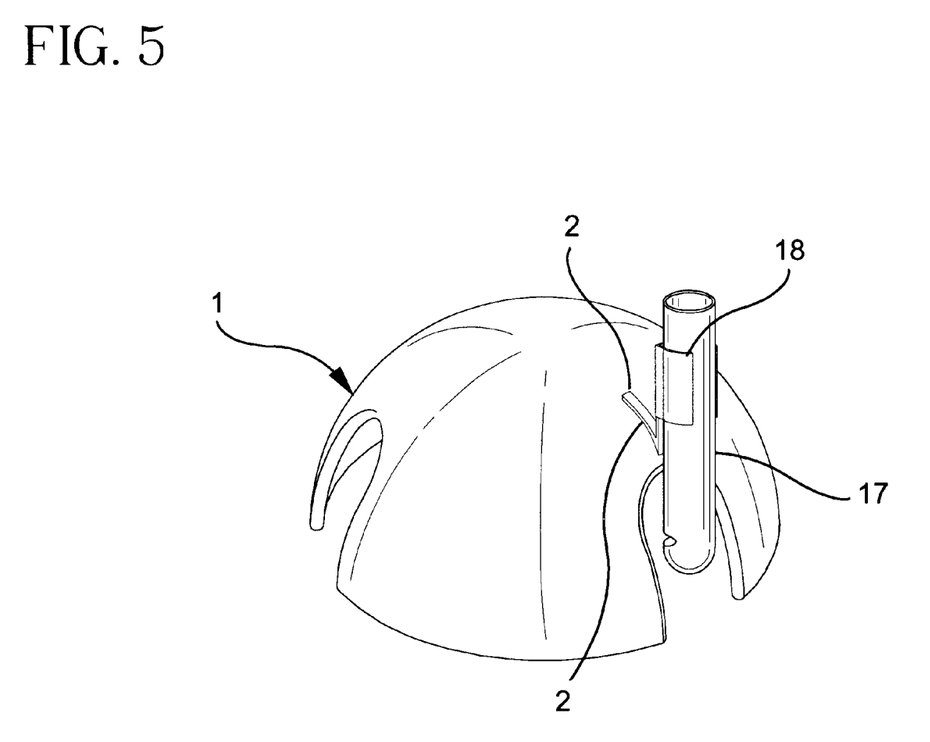
FIG. 5 is a top plan view of a animal shelter having a feeding device attached to it. Shelter 1 has a groove as a means for attachment 2. Feeding device 17 is attached to a clip 18 that has a tongue as a means of attachment 2 to the shelter.
Figure 6:
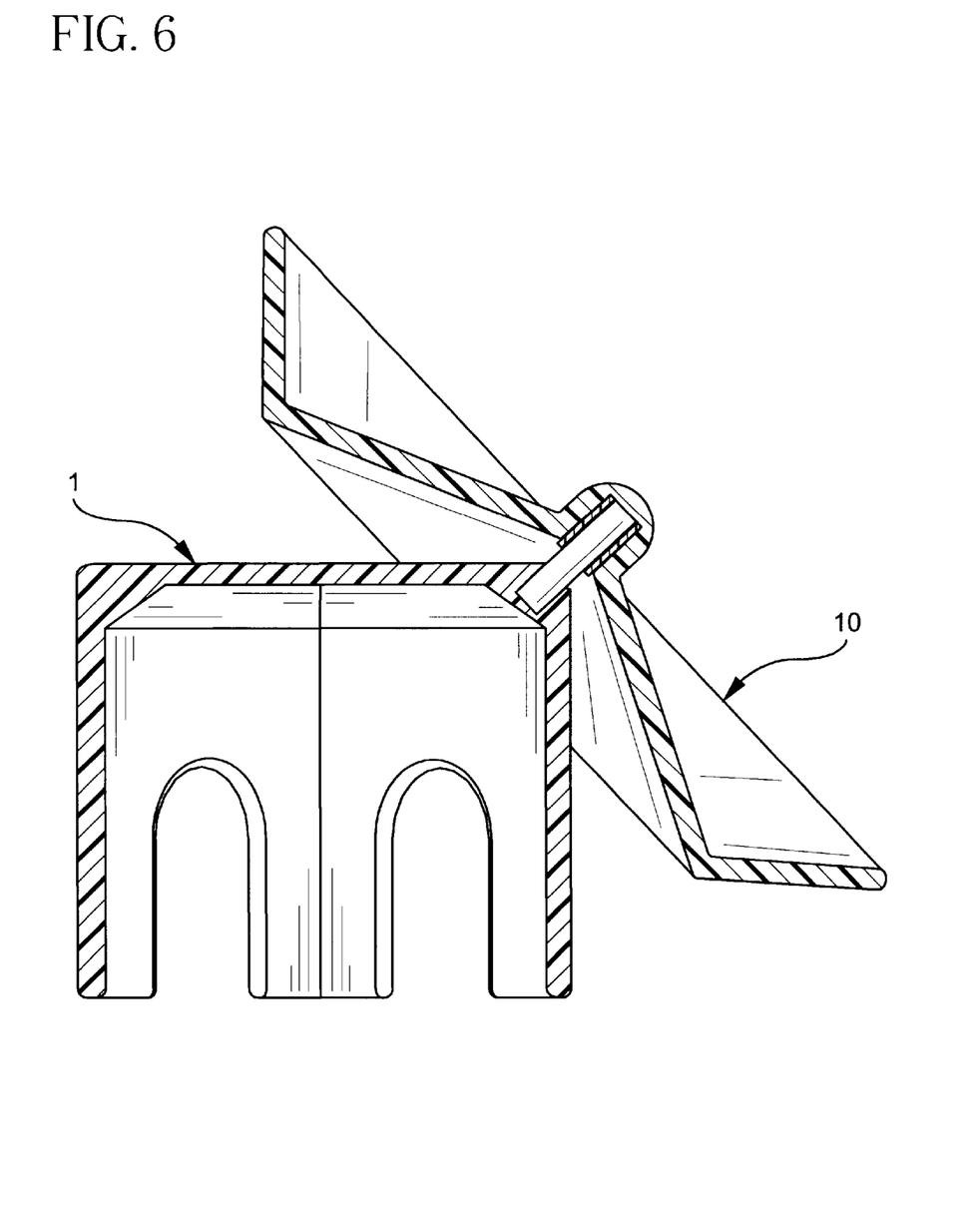
FIG. 6 is a side cross-sectional view of an exercise disk 10 attached to a square shaped hub 1. The means for attachment are the same as in FIG. 4.

Several examples are set forth below to further illustrate the nature of the invention and the manner of carrying it out. However, the invention should not be considered as being limited to the details thereof.

EXAMPLE 1
Igloo Description with Hole Means of Attachment for Shaft

LEXAN® brand polycarbonate is mixed with 0.01 percent by weight red dye based on the total weight of the mixture and melted. A two cavity mold in the shapes of two half-spheres with 3 openings equidistant along the perimeter or mid-line of each cavity of the mold is provided. The attachment means is produced by a pin protruding from the female side of the mold, which forms a cup in the surface of the shelter that is perpendicular to the surface, 26 degrees off the vertical and located equidistant between two of the openings. The mold is injected with the melted mixture. The mixture is cooled and released from the mold. The animal shelter has the following dimensions: internal height—5 cm, diameter—10 cm, opening height—3.75 cm, opening width—3.1 cm.

EXAMPLE 2
Disk Description with Shaft Means of Attachment

LEXAN® brand polycarbonate is mixed with 0.01 percent by weight blue dye based on the total weight of the mixture and melted. A two cavity mold having the shapes of two ⅛ inch thick contoured disk, each with a centrally located nipple on its upper surface, that contains a cup attachment means accessible from the lower surface of the disk. The contour of the center portion of the disk, from 0 inches to 3.5 inches of its 6 inch overall diameter, is spherical having a 4.75 inch diameter on the lower surface of the disk and a 5 inch in diameter on the upper surface of the disk. The contour of the exterior portion of the disk, from 3.5 inches to 6 inches of its diameter is also spherical, curving in the opposite direction to the center and having a 20 inch diameter on the upper surface and a 20.25 inch diameter on the lower surface. The mold is injected with the melted mixture. The mixture is cooled and released from the mold.

EXAMPLE 3
Igloo Description with Tongue and Groove

LEXANS® brand polycarbonate is mixed with 0.01 percent by weight red dye based on the total weight of the mixture and melted. A two cavity mold in the shapes of two half-spheres with 3 openings equidistant along the perimeter or mid-line of the mold is provided. The attachment means is produced by a ridge in the mold which creates a slot in the surface of the shelter that is perpendicular to the surface and located equidistant from two of the openings. The mold is injected with the melted mixture. The mixture is cooled and released from the mold. The animal shelter has the following dimensions: internal height—5 cm, diameter—10 cm, opening height—3.75 cm, opening width—3.1 cm.

What is claimed:

1. An animal shelter comprising:

an enclosure having at least one opening for ingress and egress of an animal; and a means for attaching an exercise disk, wherein the attachment means is selected from the group consisting of a hole, a protrusion, and an indentation, and the means for attaching the exercise disk is oriented such that when the exercise disk is attached to the shelter in a spinning plane, the angle between the spinning plane of the exercise disk and the horizontal plane is greater than 0° and other than 90°.

2. The shelter according to claim 1 wherein the shelter has a cup as a means for attachment; the exercise disk has a pin as a means for attachment; and the disk is attached to the shelter through connection of the cup and the pin.

3. The shelter according to claim 2 wherein the disk is attached to the shelter such that the angle between the spinning plane of the disk and the horizontal plane is from about 1° to about 45°.

4. The shelter according to claim 2 wherein the disk is attached to the shelter such that the angle between the spinning plane of the disk and the horizontal plane is from about 10° to about 35°.

* * * * *